PAPER HANDLING APPARATUS FOR MACHINE READING SYSTEMS
Filed Jan. 25, 1965
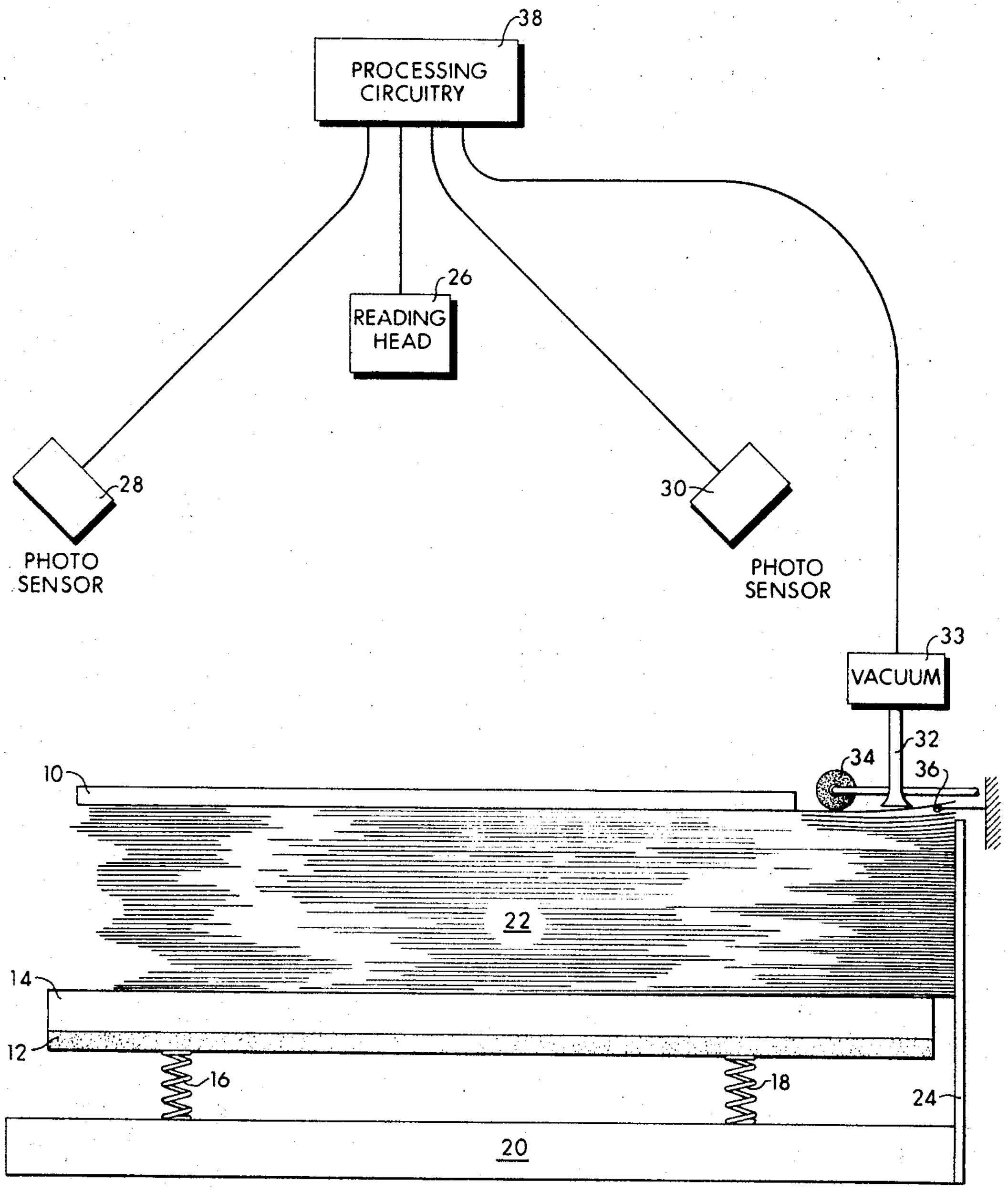
INVENTOR
STEPHEN B. GRAY
BY Stanley M. Schurgin
ATTORNEY United States Patent Office 3,422,251
Patented Jan. 14, 1969

3,422,251

PAPER HANDLING APPARATUS FOR MACHINE READING SYSTEMS

Stephen B. Gray, Cambridge, Mass., assignor to Sylvania Electric Products, Inc., a corporation of Delaware Filed Jan. 25, 1965, Ser. No. 427,600
U.S. Cl. 235—61.11 3 Claims
Int. Cl. G06k 7/015

ABSTRACT OF THE DISCLOSURE

The apparatus employs a stationary transparent plate, positioned below an electro-optical reading head, and a movable plate being urged toward the stationary transparent plate by a biasing member. The sheets of paper to be read are positioned between the stationary and movable plates with one corner of each sheet being positioned against a set of orthogonal stop plates to thereby uniformly locate the sheets in prealignment with the electro-optical reading head. After each sheet is read, a combination of a friction wheel and vacuum remove it from beneath the transparent plate.

This invention relates to machine reading systems and more particularly to apparatus for accurately handling printed pages read by such systems.

Character recognition systems, such as systems for reading printed pages, generally employ an electro-optical reading head which scans the copy and processes the information reflected from the scanned page to thereby identify the material on the page. These systems can read printed or typed copy at a very rapid rate, and to take full advantage of the speed of these systems, apparatus must be employed to swiftly and accurately transport pages to and from the machine. For optimum system operation, the pages being read must be accurately aligned with respect to the reading head. In paper handling apparatus that has heretofore been employed in such systems, a sheet is fed from a supply stack to a work station where it is read, after which it is removed to a storage tray. Since the sheet is moved to the work station, there is great chance of misalignment when the sheet is placed in operative position. The misalignment problem is aggravated by the rapid rate at which pages are conveyed to and from the reader. In addition, pages can easily become jammed during their travel to and from the reader. Mindful of the deficiencies of known paper handling appapartus, it is a prime object of the present invention to provide paper handling apparatus wherein problems of misalignment and jamming are minimized.

Another object of the invention is to provide paper handling apparatus wherein pages are prealigned in an operative position in the page reading system and are moved only after being read.

A further object of the invention is to provide a page reading system having paper handling apparatus which does not adversely affect system operation.

Briefly, the illustrated embodiment of the invention comprises apparatus for containing stacked pages in accurate alignment with an electro-optical reading head which forms part of an electro-optical page reading system. The top sheet of the stack confronts a transparent plate through which the copy on the sheet is scanned by the reading head. After the top sheet has been scanned, it is removed from the stack and transported to a storage tray. The next sheet in the stack is now in position to be scanned, the sequence continuing until all sheets have been read. Alternatively, the apparatus can be oppositely disposed so that the reading head is below the stack. In this event, it is evident that the bottom sheet in the stack is removed after being read. Since the sheets are prealigned at the work station and are not moved until after they have been read, chance of misalignment or jamming is greatly reduced.

The foregoing, together with other objects, features and advantages of the present invention will be more fully understood from the following detailed description, taken in conjunction with the accompanying drawing, the single figure of which is a diagrammatic elevation view of paper handling apparatus constructed according to the invention.

Referring to the figure, there is shown paper handling apparatus in accordance with the invention which includes a stationary transparent plate 10, and a movable plate 12 having a resilient pressure pad 14 attached thereto and urged toward plate 10 by action of springs 16 and 18, which are secured between movable plate 12 and support 20. The pages 22 are stacked between pressure pad 14 and transparent plate 10 and are positioned with one edge against stop plate 24, attached to and upstanding from support 20. All sheets are stacked with their common edge in contact with stop plate 24, and with an edge orthogonal to this common edge in contact with a second stop plate (not shown), to thereby uniformly locate the sheets in prealignment with the electro-optical reading head 26 which is part of the page reading system. The pages can be of varying size or of uneven thickness without detracting from system alignment, since all sheets are uniformly positioned against the stop plates.

In operation, the copy of the top sheet of the stack confronting transparent plate 10 is scanned by the electro-optical reading head 26, which for example may be a flying spot scanner. Reflected light containing information representative of the copy on the page is reflected from the copy to photosensors 28 and 30 located on respective opposite sides of the apparatus. Signals from the photosensors are then processed by appropriate circuitry 38 to define the scanned information. After the top sheet has been scanned by the reading head, it is removed from the stack by means of a suitable mechanism, such as a vacuum head 32 and a roller 34 operating in conjunction with an idler 36, and then transported to a suitable storage tray (not shown). The operation of such vacuum lifting and transporting apparatus is well known and will not be discussed in detail here. In brief, vacuum head 32 is energized by a vacuum source 33 on command of the processing circuitry, and is operative to lift the leading edge of the top sheet into engagement with a counterclockwise rotating rubber wheel 34. An idler roller 36 is then positioned under the lifted sheet forcing it against the driven wheel 34. The top sheet is thereby pulled out of the stack and transported via well known conveyors to a storage tray. The next sheet in the stack is now in position to be scanned in the same manner as the previous sheet, the sequence continuing until all sheets in the stack have been read. It will be noted that the sheets have been accurately positioned before the reading operation has begun and are not moved to a storage tray until after they have been read. Since the sheets are iniitally in operative position, misalignment is minimized, in contrast to known paper handling equipment wherein a sheet is fed from a supply stack to a work station.

The illustrated embodiment has been shown with the reading head positioned above the stack of pages to be read. It will be evident, however, that the entire apparatus can be oppositely positioned so that the transparent plate 10 is facing downward with the optical reading head positioned below this plate. In this latter position, compression springs would be necessary as gravity would force the sheets in the stack toward the transparent plate, although a pressure plate would still be preferable to insure positive alignment of the sheets.

From the foregoing, it is evident that relatively simple and effective paper handling apparatus has been provided which accurately prealigns a stack of sheets to be machine read and then removes sheets that have been read without disturbing the alignment of remaining sheets. The invention is not to be limited by what has been particularly shown and described, as alternative constructions will occur to those versed in the art. For example, various well known mechanisms can be employed to remove sheets from the stack. Accordingly, the invention is to be defined only as indicated in the appended claims.

What is claimed is:

1. In a machine reading system including an electro-optical reading head, apparatus for accurately handling printed pages read by said system comprising, a stack of pages, means containing said stack in precise alignment with said reading head, said means including a transparent plate on the end of said stack confronting said reading head, and means disposed on the end of said stack opposite said transparent plate and operative to urge said stack into contact with said plate, and means for removing a page from said stack after it has been read by said reading head.

2. In a machine reading system including an electro-optical reading head, apparatus for accurately handling printed pages read by said system comprising, a transparent plate having one face confronting said reading head, means positioning a stack of pages on the face of said plate opposite said confronting face, means urging said stack into contact with said plate, means for uniformly aligning common orthogonal edges of the pages in said stack, and means for removing the top sheet from said stack after it has been read by said reading head.

3. In a machine reading system including an electro-optical reading head, apparatus for accurately handling printed pages read by said system comprising, a stack of pages, a plate for supporting said stack, a transparent plate disposed above said stack and confronting said reading head, compression springs connected to said support plate and operative to urge said stack against said transparent plate, and means for removing the top sheet from said stack after it has been read by said reading head.

References Cited

UNITED STATES PATENTS

| | | | |
|---|---|---|---|
| 2,902,278 | 9/1959 | Bradshaw | 271—30 |
| 2,994,740 | 8/1961 | Conkwright et al. | 178—6 |

OTHER REFERENCES

IBM Technical Disclosure Bulletin, vol. 6, No. 2, 1963, p. 32.

MAYNARD R. WILBUR, *Primary Examiner.*

SOL SHEINBEIN, *Assistant Examiner.*

U.S. Cl. X.R.

88—24; 95—1.7; 250—219; 271—61